I. P. CADMAN.
Draft-Equalizer.
No. 217,267. Patented July 8, 1879.
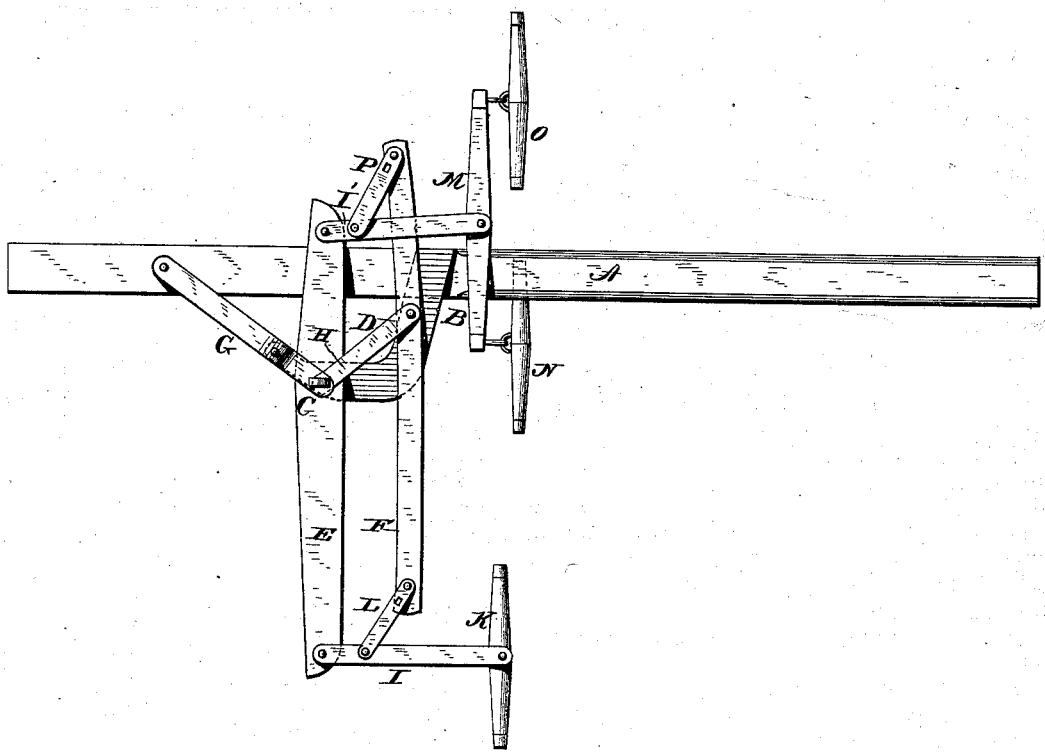

UNITED STATES PATENT OFFICE.

ISAAC P. CADMAN, OF BELOIT, WISCONSIN, ASSIGNOR OF ONE-HALF HIS RIGHT TO WILSON R. SMITH, OF SAME PLACE.

IMPROVEMENT IN DRAFT-EQUALIZERS.

Specification forming part of Letters Patent No. 217,267, dated July 8, 1879; application filed June 6, 1879.

*To all whom it may concern:*

Be it known that I, ISAAC P. CADMAN, of Beloit, in the county of Rock and State of Wisconsin, have invented certain new and useful Improvements in Draft-Equalizers; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

This invention relates to certain improvements in draft-equalizers, and is especially designed for plows and other agricultural implements; and it consists in the combination, with the draft-pole or tongue of the plow or other implement, of a compound lever, to which the single-trees are attached, whereby the strain is equally distributed to the respective horses.

The drawing represents a top view of a draft-pole or tongue of a plow or other agricultural implement, in which the letter A indicates the tongue or draft-pole, and B a side brace or offset draft-iron, to which the two levers of the compound lever are pivoted at C and D, the said levers being lettered, respectively, E and F.

The letter G indicates a brace attached to the draft-pole or tongue and to the side brace or offset draft-iron, said brace being bent upward and forward, so as to embrace, with the offset draft-iron, the lever E, so as to more securely and firmly support the same.

The letter H indicates a strap extending from the pivot of the lever E to that of the lever F, serving to brace the two.

To the ends of the lever E are secured the links I I', which extend forward, the links I at the outer end embracing at their forward extremities the single-tree K. To said links I are pivoted supplementary links L, which at their other extremities are pivoted to the outer end of the lever F. The links I' extend forward similarly to the links I, the forward extremities embracing a pivoted bar, M, to the ends of which are secured the single-trees N O.

To the links I' are secured the ends of supplementary links P, the opposite ends of which embrace and are pivoted to the inner end of the lever F.

The operation of my improved draft-equalizer will be readily understood in connection with the above description. The two horses usually employed are hitched to the single-trees N O at each side of the draft-pole or tongue, as usual. The third horse is hitched to the single-tree K, and the arrangement of the compound levers is such that the draft of the single horse equalizes the draft of the two horses, so as to give an even strain upon the plow or other implement.

I claim—

In a draft-equalizer, the combination of the draft pole or tongue and the offset draft-iron, the compound levers pivoted thereto, the links to which the single-trees are attached, and the supplementary connecting-links uniting the bar F to the links I and I', all arranged to operate substantially in the manner specified.

In testimony that I claim the foregoing I have hereunto set my hand this 2d day of June, 1879.

ISAAC P. CADMAN.

Witnesses:
 LORENZO G. WALKLY,
 F. A. DUNNELL.